Aug. 7, 1945.                J. T. MUDLER                2,380,988
                     DENTAL INSTRUMENT SHARPENER
                        Filed July 3, 1944
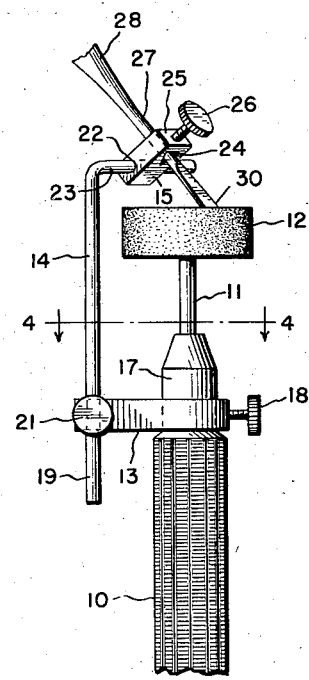
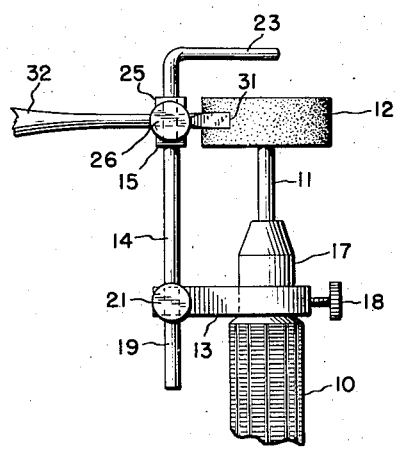
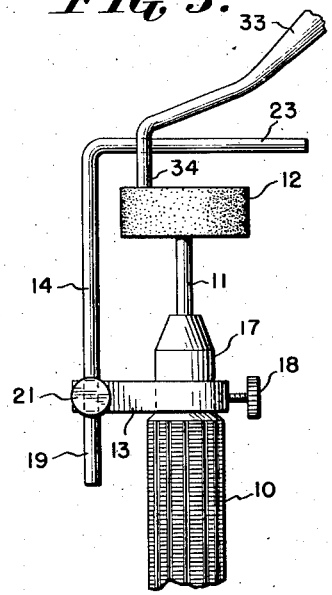
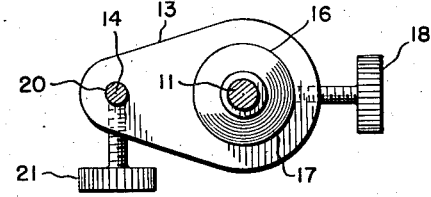
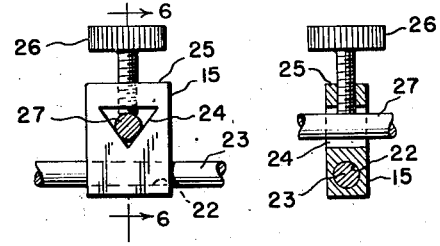
Inventor
J. T. Mudler
By W. Glenn Jones
Attorney Patented Aug. 7, 1945

2,380,988

UNITED STATES PATENT OFFICE 2,380,988

DENTAL INSTRUMENT SHARPENER

James Thomas Mudler, United States Navy, Brooklyn, N. Y.

Application July 3, 1944, Serial No. 543,375

6 Claims. (Cl. 51—220)

(Granted under the act of March 3, 1883, as amended April 30, 1928; 370 O. G. 757)

This invention relates to a dental instrument sharpener and has for an object to provide means of sharpening various dental instruments and utilizes a sharpening attachment with the usual dental engine that every practicing dentist possesses.

A further object of this invention is to provide an attachment means to be temporarily added to a dental engine whereby the dental engine is converted into a dental instrument sharpener.

A still further object of this invention is to provide a simple attachment means consisting of a few small parts which may be quickly and easily attached to and then detached from a dental engine so that it may be temporarily converted into a dental instrument sharpener, thereby enabling the dentist to keep his instruments sharp at all times and enable him to resharpen any instruments in a very few moments when necessary, taking substantially no more time in adding the sharpening attachment to the dental engine than it takes him to add any dental tool to the dental engine.

In order to make the invention more clearly understood there are shown in the accompanying drawing, means for carrying the invention into practical effect, without limiting the improvements in their useful application to the particular constructions and arrangements which, for the purpose of explanation, have been made the subject of illustration.

In the accompanying drawing:

Fig. 1 is an elevational view of the sharpening aittachment mounted in position on a dental engine slip-joint type of straight handpiece for providing a chisel edge on a dental instrument.

Fig. 2 is a similar view of the attachment with the instrument being sharpened to a hollow ground edge.

Fig. 3 is a similar view showing the attachment with the vise omitted, as when sharpening an instrument with the working tip of irregular shape.

Fig. 4 is a sectional view on line 4—4 of Fig. 1.

Fig. 5 is a large elevational view of the vise, and

Fig. 6 is a partly sectional view through the vise on line 6—6 of Fig. 5.

There is shown at 10 a conventional representation of a handpiece of any dental engine having an internal chuck for receiving and rotating a shaft 11. In this case the shaft 11 has a small grinding wheel 12 mounted thereon whereby the operation of the dental engine controls the rotation of the grinding wheel 12. In addition to the grinding wheel 12 this invention includes a base 13, a guide bar 14 and a sliding vise 15.

The base 13 has an aperture 16 of a suitable diameter that it will fit over the neck 17 of the handpiece 10. A set screw 18 extending through the side of the base 13 against the handpiece neck 17 in the aperture 16 serves to secure the base 13 firmly on the handpiece neck 17. A second and smaller aperture 20 receives the long arm 19 of the guide bar 14 therethrough which may be secured in appropriate position by means of another set screw 21. The vise 15 is provided with an aperture 22 of a diameter enabling it to slide somewhat snugly on the short angle arm 23 of guide bar 14. The vise 15 is provided with a triangular opening 24 transversely therethrough, one side of the triangular opening 24 being parallel to and closest to the end 25 of the vise 15 furtherest from the guide bar opening 22. A set screw 26 extending through this end 25 cooperates with the shank 27 of the dental instrument 28 whose end 30 is to be sharpened. The set screw 26 serves to tighten the instrument shank 27 against two sides of the triangular opening 24, thus making a firm connection.

In operation base 13 is slipped over the handpiece neck 17 and secured thereon by the set screw 18. The grinding wheel 11 is secured in the chuck of the handpiece 10 and the guide bar 14 is secured on the base 13 through the opening 20 by means of the set screw 21. The vise 15 fits snugly on the short arm 23 of the guide bar 14 and the instrument shank 27 is secured to the vise by means of the set screw 26. As thus assembled, the instrument edge 30 is brought into contact with the flat side of the grinding wheel 12 thus making it possible to provide a chisel edge on the instrument 28. If desired, the instrument 28 may be rotated 180° after the set screw has been loosened if it is desired to sharpen the instrument from both sides.

As shown in Fig. 2 the vise 15 may be removed from the short arm 23 of the guide bar 14 and placed on the long arm 19 of the guide bar 14 before it is assembled on the base 13, thus enabling the circular surface of the grinding wheel 12 to be used for hollow grinding the edge 31 of an instrument 32. On some occasions, an instrument 33 may have an end 34 on which it is desired to grind an irregular edge. In such cases, the vise 15 may be omitted and the instrument 33 may be rested against the short arm 23 of the guide bar 14 while it is being sharpened on the grinding wheel 12.

It will be understood, as previously stated, that the above description and accompanying drawing comprehend only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

What is claimed is:

1. An instrument sharpening attachment comprising a grinding wheel adapted to be mounted on an engine handpiece for rotation, a base, means for securing said base to the engine handpiece, a guide bar, means for detachably securing said guide bar to said base, and a vise for securing an instrument to be sharpened on the grinding wheel, said vise being slidably mounted on said guide bar.

2. An instrument sharpening attachment comprising a grinding wheel adapted to be mounted in an engine handpiece for rotation, a base means for securing said base to the handpiece neck, an angular guide bar consisting of a pair of arms at an angle to each other, means for securing said guide bar to said base, a vise having an aperture adapted to slidably and snugly fit on an arm of said guide bar, said vise having an opening transversely extending therethrough and means extending to said transverse opening to securely hold an instrument inserted through said transverse opening whereby such instrument may be held in sharpening position against a selected surface of said grinding wheel.

3. An instrument sharpening attachment comprising a grinding wheel adapted to be mounted in an engine handpiece for rotation, a base having an aperture adapted to fit about the neck of the handpiece, means extending through said neck aperture for securing said base to the handpiece neck, an angular guide bar consisting of a pair of arms at an angle to each other, said base having a second aperture to receive one arm of said guide bar therethrough, means extending through said second aperture for securing said guide bar to said base, a vise having an aperture adapted to slidably and snugly fit on an arm of said guide bar, said vise having an opening transversely extending therethrough and means extending through an end of said vise to said transverse opening to securely hold an instrument inserted through said transverse opening whereby such instrument may be held in sharpening position against a selected surface of said grinding wheel.

4. An instrument sharpening attachment comprising a grinding wheel adapted to be mounted in an engine handpiece for rotation, a base having an aperture adapted to fit about the neck of the handpiece, set screw means extending through said neck aperture for securing said base to the handpiece neck, an angular guide bar consisting of a pair of arms at an angle to each other, said base having a second aperture to receive one arm of said guide bar therethrough, set screw means extending through said second aperture for securing said guide bar to said base, a vise having an aperture adapted to slidably and snugly fit on an arm of said guide bar, said vise having an opening transversely extending therethrough and a set screw means extending through an end of said vise to said transverse opening to securely hold an instrument inserted through said transverse opening whereby such instrument may be held in sharpening position against a selected surface of said grinding wheel.

5. An instrument sharpening attachment comprising a grinding wheel adapted to be mounted in an engine handpiece for rotation, a base having an aperture adapted to fit about the neck of the handpiece, set screw means extending through said neck aperture for securing said base to the handpiece neck, an angular guide bar consisting of a pair of arms at an angle to each other, said base having a second aperture to receive one arm of said guide bar therethrough, set screw means extending through said second aperture for securing said guide bar to said base, a vise having an aperture adapted to slidably and snugly fit on an arm of said guide bar, said vise having a triangular opening transversely extending therethrough and a set screw means extending through an end of said vise to said transverse opening to securely hold an instrument inserted through said transverse opening whereby such instrument may be held in sharpening position against a selected surface of said grinding wheel.

6. An instrument sharpening attachment comprising a grinding wheel adapted to be mounted in the engine handpiece for rotation, a base having an aperture adapted to fit about the neck of the handpiece, set screw means extending through said neck aperture for securing said base to the handpiece neck, an angular guide bar consisting of a long arm and a short arm, said base having a second aperture to receive one arm of said guide bar therethrough, set screw means extending through said second aperture for securing said guide bar to said base, a vise having an aperture adapted to slidably and snugly fit on an arm of said guide bar, said vise having a triangular opening transversely extending therethrough and a set screw means extending through an end of said vise to said transverse opening to securely hold an instrument inserted through said transverse opening whereby such instrument may be held in sharpening position against a selected surface of said grinding wheel.

JAMES THOMAS MUDLER.